United States Patent
Wang et al.

(10) Patent No.: US 12,257,781 B2
(45) Date of Patent: Mar. 25, 2025

(54) STL MODEL SLICING METHOD AND DEVICE

(71) Applicant: SOOCHOW UNIVERSITY, Suzhou (CN)

(72) Inventors: Yihuai Wang, Suzhou (CN); Tingting Xu, Suzhou (CN); Jin Wang, Suzhou (CN); Lianmin Shi, Suzhou (CN); Rong Zhang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 499 days.

(21) Appl. No.: 17/775,296

(22) PCT Filed: Dec. 18, 2020

(86) PCT No.: PCT/CN2020/137573
§ 371 (c)(1),
(2) Date: May 8, 2022

(87) PCT Pub. No.: WO2021/253769
PCT Pub. Date: Dec. 23, 2021

(65) Prior Publication Data
US 2022/0410483 A1 Dec. 29, 2022

(30) Foreign Application Priority Data
Jun. 15, 2020 (CN) .......................... 202010544704.0

(51) Int. Cl.
*B29C 64/386* (2017.01)
*B29C 64/129* (2017.01)
*B33Y 50/02* (2015.01)

(52) U.S. Cl.
CPC .......... *B29C 64/386* (2017.08); *B29C 64/129* (2017.08); *B33Y 50/02* (2014.12)

(58) Field of Classification Search
CPC ..... B29C 64/386; B29C 64/129; B33Y 50/02; B33Y 10/00; B33Y 50/00; G06F 30/10;
(Continued)

(56) References Cited

U.S. PATENT DOCUMENTS

| | | | |
|---|---|---|---|
| 2010/0218161 | A1 | 8/2010 | Sahouria et al. |
| 2014/0253549 | A1* | 9/2014 | Bachrach ................ G06T 19/00 345/420 |

(Continued)

FOREIGN PATENT DOCUMENTS

| | | | |
|---|---|---|---|
| CN | 105705318 A | 6/2016 | |
| CN | 106273485 A | 1/2017 | |

(Continued)

*Primary Examiner* — Christopher W Carter
(74) *Attorney, Agent, or Firm* — SZDC Law PC (57) ABSTRACT

An STL model slicing method includes: reading and loading an STL model; obtaining a first slice plane; according to a first set thickness, making the first slice plane be horizontally tangential to an STL model to obtain a first profile curve, which is a profile curve of a tangent plane of the STL model and the first slice plane; determining whether the profile curve contains a physical portion of the STL model; if the profile curve contains the physical portion of the STL model, filling the physical portion with white to obtain a white portion; determining a non-physical portion in the profile curve according to the physical portion; filling the non-physical portion with black to form a mask of the tangent plane; and projecting the mask onto a liquid photosensitive resin by means of a first 3D printer, and then curing the white portion to be a first cured profile.

7 Claims, 2 Drawing Sheets

(58) Field of Classification Search
CPC .... G06F 2113/10; G06F 30/20; G06T 3/4038; G06T 17/00; G06T 2200/04
See application file for complete search history.

(56) References Cited

U.S. PATENT DOCUMENTS

| | | |
|---|---|---|
| 2015/0029187 A1 | 1/2015 | Nakamura |
| 2016/0133050 A1* | 5/2016 | Sakurai .................. G06T 19/00 345/423 |
| 2017/0291261 A1 | 10/2017 | Mathur |
| 2019/0091988 A1* | 3/2019 | Das ........................ B33Y 50/02 |
| 2020/0353683 A1* | 11/2020 | Yang ..................... B29C 64/321 |

FOREIGN PATENT DOCUMENTS

| | | |
|---|---|---|
| CN | 108381910 A | 8/2018 |
| CN | 110191806 A | 8/2019 |
| CN | 111805894 A | 10/2020 |
| JP | 2006035602 A | 2/2006 |
| KR | 101642041 B1 | 7/2016 |

\* cited by examiner

STL MODEL SLICING METHOD AND DEVICE

This application is the National Stage Application of PCT/CN2020/137573, filed on Dec. 18, 2020, which claims priority to Chinese Patent Application No. 202010544704.0, filed on Jun. 15, 2020, which is incorporated by reference for all purposes as if fully set forth herein.

FIELD OF THE DISCLOSURE

The present application relates to the field of data processing technologies, and particularly to an STL model slicing method and device.

BACKGROUND OF THE DISCLOSURE 3D printing is a technology in which discrete raw materials are added layer by layer with a three-dimensional model file as a blueprint according to a layered manufacturing principle, so as to construct a three-dimensional solid model. Among subdivisions of plural 3D printing technologies, a 3D printing technology based on digital light processing (DLP), due to high printing precision and finished-product surface smoothness, is widely applied to precision casting, biomedical treatment and other aspects, and becomes a focus of research in the current 3D printing industry.

However, during implementation of the technical solution in embodiments of the present application, the inventor of the present application finds that the above-mentioned prior art has at least the following technical problem: acquisition of a slice bitmap contour is related to printing accuracy of slice information, and in the prior art, when the slice contour is filled in a process of slicing a complicated STL model with nested contours, a filling result may be inaccurate, such that the STL model is sliced inaccurately.

SUMMARY OF THE DISCLOSURE

Embodiments of the present application provide an STL model slicing method and device, which solve a technical problem that in a prior art, when a slice contour is filled in a process of slicing a complicated STL model with nested contours, a filling result may be inaccurate, such that the STL model is sliced inaccurately, and achieve technical effects of accurately obtaining contour information of a slice bitmap, improving printing accuracy of the slice bitmap and improving precision of a 3D printing model.

In order to achieve the above object, the technical solution provided by an embodiment of the present invention is as follows:

An STL model slicing method includes: reading and loading an STL model; obtaining a first slicing plane; horizontally cutting the STL model with the first slicing plane according to a first set thickness to obtain a first contour curve, the first contour curve being a contour curve of a section of the STL model obtained by the first slicing plane; judging whether the contour curve contains a solid part of the STL model; if the contour curve contains the solid part of the STL model, filling the solid part with white to obtain a white part; determining a non-solid part in the contour curve according to the solid part; filling the non-solid part with black to form a mask of the section; and projecting the mask to liquid photosensitive resin by a first 3D printer, so as to cure the white part into a first cured contour.

As a further improvement of the present invention, quantifying voxel information of the STL model according to a voxel quantification method, so as to obtain a voxel region and an external region of the section, the voxel region having a count value greater than 0, and the external region having a count value of 0; and filling the voxel region with white and the external region with black.

As a further improvement of the present invention, the quantifying voxel information of the STL model according to a voxel quantification method, so as to obtain a voxel region and an external region of the section comprises: setting observation angle information and observation position information; determining a normal vector pointing to an observation angle as a forward vector according to the observation angle; determining a normal vector opposite to the observation angle as a backward vector according to the observation angle; setting initial values of a first region and a second region of the section in the STL model to 0; proceeding towards an observation position from a position outside the STL model and opposite to the observation position, and judging whether a normal vector of the first region is the forward vector or the backward vector; if the normal vector of the first region is the forward vector, subtracting 1 from the initial value of the first region to determine a first count value of the first region; judging whether a normal vector of the second region is the forward vector or the backward vector; if the normal vector of the second region is the backward vector, adding 1 to the initial value of the second region to determine a second count value of the second region; and determining the first region to be the external region and the second region to be the voxel region according to the first count value.

As a further improvement of the present invention, obtaining a first slice bitmap according to the first contour curve; judging whether the first slice bitmap conforms to a preset projection size; when the first slice bitmap exceeds the preset projection size, determining that a splicing mode is required for the first slice bitmap; uniformly splitting the first slice bitmap according to the splicing mode to obtain a series of unit bitmaps, the series of unit bitmaps including a first unit bitmap and a second unit bitmap; obtaining an overlapped part of the first unit bitmap and the second unit bitmap; judging whether overlapped pixels of the overlapped part have values of 0; and when the overlapped pixels of the overlapped part do not have values of 0, graying edge pixels of the first unit bitmap and the second unit bitmap to obtain unit bitmaps with sizes capable of being projected by the projection apparatus.

As a further improvement of the present invention, further including: obtaining a construction width $B_w$ of the first 3D printer; obtaining a single projection width $P_w$ of a single projection apparatus; obtaining a width $C_w$ of the overlapped part, wherein $C_w \in [0, P_w)$; obtaining a width difference x between a sum of the projection widths and the construction width, wherein $x \in [0, P_w)$ and calculating a number of split blocks according to the construction width, the projection width, the width of the overlapped part and the width difference, wherein the number of the split blocks is $m = \lceil (B_w - C_w)/(P_w - C_w) \rceil$, and m is the number of the split blocks of the first slice bitmap.

As a further improvement of the present invention, further including: judging whether the width difference between the sum of the projection widths and the construction width is 0; when the width difference between the sum of the projection widths and the construction width is not 0, filling a final width of a last unit bitmap cut from the first slice bitmap with black, and determining the width of each unit bitmap in the series of unit bitmaps as the projection width; and obtaining a filling width of each unit bitmap according to the width of each unit bitmap in the series of unit bitmaps, the filling width being $Tw=P_w \times m - C_w \times (m-1) - B_w$, $P_w$ being the projection width, $C_w$ being the width of the overlapped part, m being the number of the split blocks of the first slice bitmap, and x being the width difference between the sum of the projection widths and the construction width.

As a further improvement of the present invention, further including: splicing the first slice bitmap and a second slice bitmap to determine a first spliced bitmap; judging whether a staggering parameter of the first spliced bitmap is equal to zero; when the staggering parameter of the first spliced bitmap is not equal to zero, performing a staggered splitting operation on the first slice bitmap and the second slice bitmap to obtain a staggered split pattern; filling the staggered split pattern with pattern pixels to obtain a third unit bitmap; judging whether the third unit bitmap meets a preset condition; and when the third unit bitmap meets the preset condition, determining the first projection information.

An STL model slicing device includes: a first obtaining unit configured to read and load an STL model; a second obtaining unit configured to obtain a first slicing plane; a third obtaining unit configured to horizontally cut the STL model with the first slicing plane according to a first set thickness to obtain a first contour curve, the first contour curve being a contour curve of a section of the STL model obtained by the first slicing plane; a first judging unit configured to judge whether the contour curve contains a solid part of the STL model; a first operating unit configured to, if the contour curve contains the solid part of the STL model, fill the solid part with white to obtain a white part; a first determining unit configured to determine a non-solid part in the contour curve according to the solid part; a first forming unit configured to fill the non-solid part with black to form a mask of the section; a second operating unit configured to project the mask and the white part to liquid photosensitive resin by a first 3D printer, so as to cure the white part into a first cured contour.

An STL model slicing device includes a memory, a processor and a computer program stored on the memory and executable on the processor, wherein the processor implements the steps of the method when executing the program.

A computer-readable storage medium having a computer program stored thereon, which when executed by a processor, implements the steps of the method.

The embodiments of the present application provide the STL model slicing method and device, the method including: reading and loading the STL model; obtaining the first slicing plane; horizontally cutting the STL model with the first slicing plane according to the first set thickness to obtain the first contour curve, the first contour curve being the contour curve of the section of the STL model obtained by the first slicing plane; judging whether the contour curve contains the solid part of the STL model; if the contour curve contains the solid part of the STL model, filling the solid part with white to obtain the white part; determining the non-solid part in the contour curve according to the solid part; filling the non-solid part with black to form the mask of the section; and projecting the mask to the liquid photosensitive resin by the first 3D printer, so as to cure the white part into the first cured contour, thus solving the technical problem that in the prior art, when the slice contour is filled in the process of slicing the complicated STL model with the nested contours, the filling result may be inaccurate, such that the STL model is sliced inaccurately, and achieving the technical effects of accurately obtaining the contour information of the slice bitmap, improving the printing accuracy of the slice bitmap and improving the precision of the 3D printing model.

The foregoing description is only an overview of the technical solutions of the present application. For clearer understanding of the technical means of the present application, the present application may be implemented according to the content of the specification, and to make the foregoing and other objectives, features, and advantages of the present application clearer and more comprehensible, embodiments of the present application are described below.

Beneficial Effects of Invention

The embodiments of the present application provide the STL model slicing method and device, the method including: reading and loading the STL model; obtaining the first slicing plane; horizontally cutting the STL model with the first slicing plane according to the first set thickness to obtain the first contour curve, the first contour curve being the contour curve of the section of the STL model obtained by the first slicing plane; judging whether the contour curve contains the solid part of the STL model; if the contour curve contains the solid part of the STL model, filling the solid part with white to obtain the white part; determining the non-solid part in the contour curve according to the solid part; filling the non-solid part with black to form the mask of the section; and projecting the mask to the liquid photosensitive resin by the first 3D printer, so as to cure the white part into the first cured contour, thus solving the technical problem that in the prior art, when the slice contour is filled in the process of slicing the complicated STL model with the nested contours, the filling result may be inaccurate, such that the STL model is sliced inaccurately, and achieving the technical effects of accurately obtaining the contour information of the slice bitmap, improving the printing accuracy of the slice bitmap and improving the precision of the 3D printing model.

The foregoing description is only an overview of the technical solutions of the present application. For clearer understanding of the technical means of the present application, the present application may be implemented according to the content of the specification, and to make the foregoing and other objectives, features, and advantages of the present application clearer and more comprehensible, embodiments of the present application are described below.

Reference numerals: first obtaining unit 11, second obtaining unit 12, third obtaining unit 13, first judging unit 14, first operating unit 15, first determining unit 16, first forming unit 17, second operating unit 18, bus 300, receiver 301, processor 302, transmitter 303, memory 304, and bus interface 306.

DETAILED DESCRIPTION OF PREFERRED EMBODIMENTS

Embodiments of the present application provide an STL model slicing method and device, which solve a technical problem that in a prior art, when a slice contour is filled in a process of slicing a complicated STL model with nested contours, a filling result may be inaccurate, such that the STL model is sliced inaccurately, and achieve technical effects of accurately obtaining contour information of a slice bitmap, improving printing accuracy of the slice bitmap and improving precision of a 3D printing model.

Application Overview

In a DLP-based 3D printing technology, a digital image of a cross-sectional mask of a three-dimensional model is projected onto liquid photosensitive resin with ultraviolet light by a DLP projection apparatus, thus curing an irradiated part. The DLP projection apparatus has two common mounting methods, and an upper-exposure-type 3D printing system and a lower-exposure-type 3D printing system are mainly included according to a position of the projection apparatus relative to a liquid tank.

In order to solve the above-mentioned technical problem, the technical solution of the present application has the following general idea: an STL model slicing method includes: reading and loading an STL model; obtaining a first slicing plane; horizontally cutting the STL model with the first slicing plane according to a first set thickness to obtain a first contour curve, the first contour curve being a contour curve of a section of the STL model obtained by the first slicing plane; judging whether the contour curve contains a solid part of the STL model; if the contour curve contains the solid part of the STL model, filling the solid part with white to obtain a white part; determining a non-solid part in the contour curve according to the solid part; filling the non-solid part with black to form a mask of the section; and projecting the mask to liquid photosensitive resin by a first 3D printer, so as to cure the white part into a first cured contour, thus solving the technical problem that in the prior art, when the slice contour is filled in the process of slicing the complicated STL model with the nested contours, the filling result may be inaccurate, such that the STL model is sliced inaccurately, and achieving the technical effects of accurately obtaining the contour information of the slice bitmap, improving the printing accuracy of the slice bitmap and improving the precision of the 3D printing model.

The technical solution of the present application is described in detail below with reference to the accompanying drawings and embodiments, and it should be understood that the embodiments of the present application and specific features in the embodiments are detailed descriptions of the technical solution of the present application, rather than limitations of the technical solution of the present application, and the embodiments of the present application and the technical features in the embodiments may be combined with each other without conflict.

First Embodiment

Figure 1:
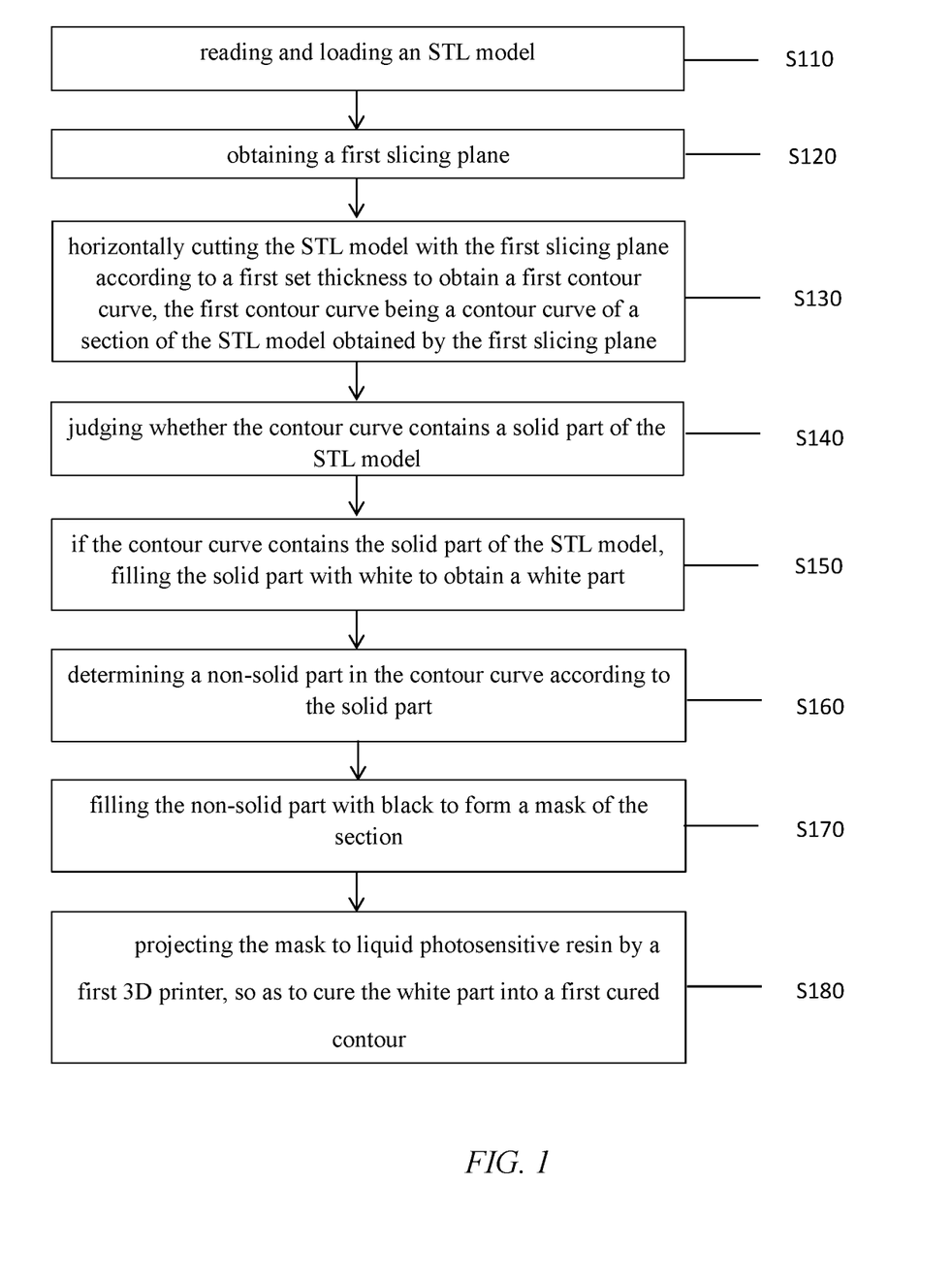
FIG. 1 is a schematic flow diagram of an STL model slicing method according to an embodiment of the present invention.

The embodiment of the present invention provides an STL model slicing method applied to a 3D printing system, the printing system includes a 3D printer and a PC, and the PC has an STL model slicing preprocessing function and a 3D printing flow control function; that is, the PC may preprocess a first slice bitmap and control the 3D printer to perform a printing operation. The method includes: step S110: reading and loading an STL model.

Specifically, a model of an object to be printed is drawn using three-dimensional modeling software, such as CAD, or the like, so as to obtain three-dimensional model data. Then, the three-dimensional model data is approximately processed into the STL model, and finally, the STL model is loaded into the PC and read.

Step S120: obtaining a first slicing plane. Specifically, the first slicing plane is a plane and parallel to a bottom surface of the STL model. When sliced, the STL model is evenly cut from a bottom of the STL model upwards in the Z-axis direction by the first slicing plane according to a first set thickness, so as to obtain a series of ordered three-dimensional model cross section bitmaps, and each cross section serves as a slice bitmap; that is, the series of slice bitmaps are obtained. The X axis and the Y axis are perpendicular to each other to form a first plane, the bottom surface of the STL model is located in the first plane, and the first slicing plane is parallel to the first plane. The Z axis is perpendicular to the X axis and the Y axis and parallel to a height direction of the STL model, and a positive direction of the Z axis is vertically upward from the bottom of the STL model.

Step S130: horizontally cutting the STL model with the first slicing plane according to the first set thickness to obtain a first contour curve, the first contour curve being a contour curve of a section of the STL model obtained by the first slicing plane. Specifically, the first slice bitmap is obtained, and is any slice bitmap of the STL model. The first contour curve is an intersection line (i.e., a contour curve of the first slice bitmap) of the first slicing plane and the STL model when the first slice bitmap is cut.

Step S140: judging whether the contour curve contains a solid part of the STL model; step S150: if the contour curve contains the solid part of the STL model, filling the solid part with white to obtain a white part; step S160: determining a non-solid part in the contour curve according to the solid part; and step S170: filling the non-solid part with black to form a mask of the section. Specifically, whether the solid part of the STL model is contained in the contour curve is judged, and if the solid part is contained, the solid part is filled with white. The part other than the solid part is the non-solid part, the non-solid part is filled with black to obtain the black part, and the black part and the white part form the mask of the first slice bitmap.

Step S180: projecting the mask to liquid photosensitive resin by a first 3D printer, so as to cure the white part into a first cured contour.

Specifically, the first 3D printer includes a projection apparatus which projects a digital image of the mask onto the liquid photosensitive resin with ultraviolet light, and the ultraviolet light is transmitted through the white part to cure the resin, thus forming the first cured contour; the ultraviolet light is hardly transmitted through the black part, and the resin is not cured.

Further, the method includes: quantifying voxel information of the STL model according to a voxel quantification method, so as to obtain a voxel region and an external region of the section, the voxel region having a count value greater than 0, and the external region having a count value of 0; and filling the voxel region with white and the external region with black.

Further, the quantifying voxel information of the STL model according to a voxel quantification method, so as to obtain a voxel region and an external region of the section includes: setting observation angle information and observation position information; determining a normal vector pointing to an observation angle as a forward vector according to the observation angle; determining a normal vector opposite to the observation angle as a backward vector according to the observation angle; setting initial values of a first region and a second region of the section in the STL model to 0; proceeding towards an observation position from a position outside the STL model and opposite to the observation position, and judging whether a normal vector of the first region is the forward vector or the backward vector; if the normal vector of the first region is the forward vector, subtracting 1 from the initial value of the first region to determine a first count value of the first region; judging whether a normal vector of the second region is the forward vector or the backward vector; if the normal vector of the second region is the backward vector, adding 1 to the initial value of the second region to determine a second count value of the second region; and determining the first region to be the external region and the second region to be the voxel region according to the first count value.

Specifically, a tessellation idea is adopted in an STL file, a curved surface contour of the object is approximated with a plurality of triangles, and the triangles on the contour have different orientations. A normal vector perpendicular to a curved surface is generated using a right-hand rule according to a storage sequence of vertexes of the triangles, and in the STL file, the normal vectors are specified to point to an exterior of the object from an interior of the object. The STL file contains coordinates of vertexes of triangles and coordinates of normal vectors of the triangles approximating a surface contour of the model. Voxel information quantization has a core idea that voxels in the model are calibrated by means of normal vector information of the STL model, so as to clearly distinguish internal information from external information of the model.

One observation position and one observation angle are set, and the observation position is located outside the STL model. The normal vector pointing to the observation angle is defined as the forward vector, and the normal vector opposite to the observation angle is defined as the backward vector. Each region in a space has an initial value set to 0, and each of the first region and the second region is any region in the model. During the proceeding towards the observation position from the position outside the STL model and opposite to the observation position, when a contour with a backward normal vector is encountered, the 1 addition operation is performed on a region after the contour; when a contour with a forward normal vector is encountered, the 1 subtraction operation is performed on the region after the contour; the region with the count value greater than 0 is the voxel region of the model; the region with the count value of 0 is the external region of the model. The voxel region is filled with white and the external region is filled with black.

Further, the method includes: obtaining the first slice bitmap according to the first contour curve; judging whether the first slice bitmap conforms to a preset projection size; when the first slice bitmap exceeds the preset projection size, determining that a splicing mode is required for the first slice bitmap; uniformly splitting the first slice bitmap according to the splicing mode to obtain a series of unit bitmaps, the series of unit bitmaps including a first unit bitmap and a second unit bitmap; obtaining an overlapped part of the first unit bitmap and the second unit bitmap; judging whether overlapped pixels of the overlapped part have values of 0; and when the overlapped pixels of the overlapped part do not have values of 0, graying edge pixels of the first unit bitmap and the second unit bitmap to obtain unit bitmaps with sizes capable of being projected by the projection apparatus.

Specifically, the first contour curve is the contour curve of the first slice bitmap; that is, the first contour curve is contained in the first slice bitmap. The preset projection size is a size of a projection image of the projection apparatus, and when the size of the first slice bitmap exceeds the preset projection size, the first slice bitmap is over large and exceeds a projection range of the projection apparatus, and the first slice bitmap is determined to be required to be split using the splicing mode, such that the split bitmap is within the projection range of the projection apparatus. The first slice bitmap is split in a width direction using the splicing mode to obtain the series of unit bitmaps, the series of unit bitmaps includes the first unit bitmap and the second unit bitmap, the first unit bitmap is adjacent to the second unit bitmap, the first unit bitmap and the second unit bitmap are within the preset projection size range, and the first unit bitmap has a length equal to a length of the second unit bitmap.

During projection, the first unit bitmap is projected first, the projection apparatus is then horizontally moved rightwards by a first distance, and then, the second bitmap is projected. In the projection process, the first unit bitmap and the second unit bitmap have the overlapped part, and the overlapped part has a length equal to the length of the first unit bitmap. Whether the pixels of the overlapped part all have values of 0 is judged, and when the pixels of the overlapped part have values of 0, the overlapped part is the external region and filled with white; when the pixels of the overlapped part do not have values of 0, the overlapped part is the voxel region. At this point, if the pixels of the overlapped region have values directly equal to 1, the overlapped region is irradiated twice during projection irradiation, and a sum of ultraviolet irradiation intensities of the overlapped region is greater than that of the rest positions, such that a curing depth of the overlapped region is greater than that of the rest positions, thus affecting forming precision of the model. Reduction of a gray value of a certain pixel according to a DLP projection principle actually reduces a proportion of projection time of the pixel in unit time, thereby reducing exposure duration of the overlapped part and reducing the curing depth of the overlapped part.

The graying edge pixels of the first unit bitmap and the second unit bitmap specifically includes: setting a part of the overlapped region on the first unit bitmap as the first region and a part of the overlapped region on the second unit bitmap as the second region, the first region, the second region and the overlapped region being equal to one another. A gray value of the first region is reduced to a first gray value, a gray level of the second region is set to a second gray value, and a sum of the first gray value and the second gray value is 1, so as to reduce the proportion of the single projection time of the overlapped region, reduce the single exposure time of the overlapped part, and reduce the single curing depth of the overlapped part, thereby achieving a technical effect that after two times of irradiation, the curing depth of the overlapped part is equal to the curing depths of the rest positions, and the first slice bitmap has an equal curing thickness.

Further, the method includes: obtaining a construction width $B_w$ of the first 3D printer; obtaining a single projection width $P_w$ of a single projection apparatus; obtaining a width $C_w$ of the overlapped part, wherein $C_w \in [0, P_w)$; obtaining a width difference x between a sum of the projection widths and the construction width, wherein $x \in [0, P_w)$; and calculating a number of split blocks according to the construction width, the projection width, the width of the overlapped part and the width difference, wherein the number of the split blocks is $m=\lceil(B_w-C_w)/(P_w-C_w)\rceil$, and m is the number of the split blocks of the first slice bitmap.

Specifically, for example, a transverse splicing operation is performed on the first slice bitmap, a sum of the widths of plural splicing projections is not consistent with the construction width $B_w$, and in order to ensure that a projection surface may cover a construction region, the sum of the projection widths is generally greater than the construction width. The first slice bitmap is transversely divided into m blocks, and then, $$B_w = P_w \times m - C_w \times (m-1) - x \quad (1)$$

The following equation may be derived from Equation (1):

$$m = \lceil(B_w - C_w)/(P_w - C_w)\rceil \quad (2)$$

wherein $\lceil \cdot \rceil$ means an operation of rounding up to an integer.

In the embodiment of the present application, the number of the blocks cut from the slice bitmap is obtained according to the construction width of the printer, the projection width of the projection apparatus and the width of the overlapped part, and a basis is provided for the splitting operation of the slice bitmap, thus improving splitting accuracy.

Further, the method includes: judging whether the width difference between the sum of the projection widths and the construction width is 0; when the width difference between the sum of the projection widths and the construction width is not 0, filling a final width of a last unit bitmap cut from the first slice bitmap with black, and determining the width of each unit bitmap in the series of unit bitmaps as the projection width; and obtaining a filling width of each unit bitmap according to the width of each unit bitmap in the series of unit bitmaps, the filling width being $T_w = P_w \times m - C_w \times (m-1) - B_w$, $P_w$ being the projection width, $C_w$ being the width of the overlapped part, m being the number of the split blocks of the first slice bitmap, and x being the width difference between the sum of the projection widths and the construction width.

Specifically, the first slice bitmap is transversely and uniformly split into m blocks, and the overlapped part exists between every two adjacent unit bitmaps and has a width $C_w$. The series of unit bitmaps is counted from left to right, the width of the ith (i=0, 1, . . . , m−1) unit bitmap is the projection width, and then, a distance between a leftmost side of the ith (i=0, 1, . . . , m−1) unit bitmap and a leftmost side of the first slice bitmap is:

$$L_1 = i \times (P_w - C_w) \quad (3)$$

A distance between a rightmost side of the ith unit bitmap and a rightmost side of the first slice bitmap is:

$$L_2 = i \times (P_w - C_w) + P_w \quad (4)$$

In order to ensure that the series of unit bitmaps is not stretched and deformed during a full-screen projection, when the difference x between the sum of the projection widths and the construction width is not zero, a right side of the last unit bitmap is required to be filled with black pixels, such that the width of the last unit bitmap is equal to the projection width, thus ensuring that the widths of all the unit bitmaps in the series of unit bitmaps are equal to the projection width $P_w$. The filling width is:

$$T_w = P_w \times m - C_w \times (m-1) - B_w \quad (5)$$

In the embodiment of the present application, the width of each unit bitmap in the series of unit bitmaps is guaranteed to be equal to the projection width, and the unit bitmap is not processed during the projection, thus improving a projection efficiency; meanwhile, the unit bitmap is not stretched during the projection, which guarantees a true scale of the projected image, and improves precision of a cured pattern, thereby improving 3D printing precision.

Further, The method includes: obtaining a first training model, the first training model being obtained by a training operation using a plurality of groups of first data, and each group of first data including slice bitmap information and slice bitmap mask information; and inputting first slice bitmap information into the first training model to obtain first mask information, the first mask information being the mask of the first slice bitmap.

Specifically, the first training model is a neural network model in a machine learning technology, and a neural network (NN) is a complex network system formed by widely connecting a large number of simple processing units (called neurons) with one another, reflects many basic features of human brain functions, and is a highly complex nonlinear dynamical learning system. The neural network has large-scale parallel, distributed storage and processing, self-organization, self-adaptation and self-learning capabilities, and is particularly suitable for processing imprecise and fuzzy information processing problems in which many factors and conditions are required to be considered simultaneously. The neural network model is described based on a mathematical model of neurons. An artificial neural network (ANN) is a description of first-order characteristics of the human brain system. Briefly, the ANN is a mathematical model. The neural network model is represented by network topology, node characteristics, and learning rules. The first training model is trained using the large number of groups of first data, such that the first training model has a capability of recognizing the slice bitmap mask information. The first slice bitmap is input into the first training model, and the first training model outputs first slice bitmap mask information (i.e., the first mask information) according to the first slice bitmap information.

Further, the method includes: splicing the first slice bitmap and a second slice bitmap to determine a first spliced bitmap; judging whether a staggering parameter of the first spliced bitmap is equal to zero; when the staggering parameter of the first spliced bitmap is not equal to zero, performing a staggered splitting operation on the first slice bitmap and the second slice bitmap to obtain a staggered split pattern; filling the staggered split pattern with pattern pixels to obtain a third unit bitmap; judging whether the third unit bitmap meets a preset condition; and when the third unit bitmap meets the preset condition, determining the first projection information.

Specifically, a seam tends to be formed between two adjacent unit bitmaps, and a seam region is a place where errors are concentrated and accumulated. In the embodiment of the present application, a solution of eliminating the seam using a staggered even sharing method is provided, the staggered even sharing method has a core idea of even error sharing, and the seam regions of layers are staggered, such that the error at the seam is evenly shared at different positions of the layers. The first slice bitmap information is formed by splicing at least two unit bitmaps, the second slice bitmap is also formed by splicing at least two unit bitmaps, the first slice bitmap has a first seam, the second slice bitmap has a second seam, and first spliced bitmap information includes the first seam and the second seam. The first slice bitmap and the second slice bitmap are adjacent slice bitmaps, and a distance between the first seam and the second seam is the staggering parameter.

The staggering parameter is set according to user requirements, and when the staggering parameter is zero, a user is not required to perform the staggered splitting operation on the series of slice bitmaps, and the series of slice bitmaps are not subjected to the staggered splitting operation at this point; and when the staggering parameter is not equal to zero, the user is required to perform the staggered splitting operation on the series of slice bitmaps, and the staggered splitting operation is performed on the series of slice bitmaps according to the staggering parameter, such that the distance of the seam between two adjacent slice bitmaps is the staggering parameter.

The filling the staggered split pattern with pattern pixels specifically includes: re-splitting the first slice bitmap into a fourth unit bitmap and a fifth unit bitmap; if the fourth unit bitmap is located on a left side of the first slice bitmap and has a length X, the projection apparatus has a projection length A, A is greater than X, and the fourth unit bitmap has a width the same as the projection width of the projection apparatus, filling a (A-X) width range of a left side of the fourth unit bitmap with black, wherein a range of a right side of the fourth unit bitmap with a length X is an original image, thereby obtaining the third unit bitmap; the third unit bitmap has a length A and a width equal to a width of the projection apparatus, thus ensuring that a size and a resolution of the third unit bitmap are consistent with a size and a resolution of the projection apparatus; when a full-screen projection is performed on the third unit bitmap by the projection apparatus, the third unit bitmap is not stretched, thus guaranteeing the printing precision.

Similarly, if the fourth bitmap is located on a right side of the first slice bitmap, a (A-X) width range of the right side of the fourth unit bitmap is filled with black, and a range of the left side of the fourth bitmap with a length X is the original image, thereby obtaining the third unit bitmap; the third unit bitmap has the length A and the width equal to the width of the projection apparatus.

After the staggered splitting operation is performed on the first slice bitmap and the second slice bitmap, the third unit bitmap is obtained; then, whether the third unit bitmap is an all-black image is judged, and if the third unit bitmap is an all-black image, no exposure is required, and the projection apparatus is directly moved to the next unit bitmap to expose the next unit bitmap; if the third unit bitmap is not an all-black image, exposure is performed according to a display of the third unit bitmap, so as to achieve technical effects of optimizing a printing process and accelerating the printing process. The preset condition is the all-black image, and first projection exposure information indicates that a projection exposure operation is not performed on the third unit bitmap.

Second Embodiment

Figure 2:
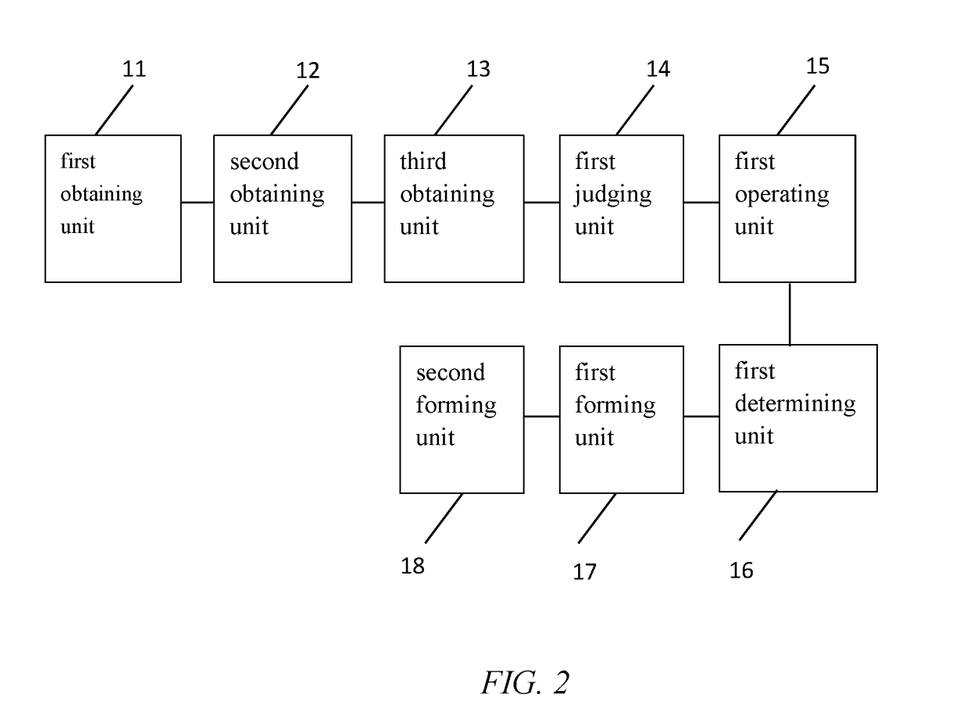
FIG. 2 is a schematic structural diagram of an STL model slicing device according to an embodiment of the present invention.

Based on the same inventive concept as the STL model slicing method according to the foregoing embodiment, the present invention further provides an STL model slicing device, and as shown in FIG. 2, the device includes: a first obtaining unit 11 configured to read and load an STL model; a second obtaining unit 12 configured to obtain a first slicing plane; a third obtaining unit 13 configured to horizontally cut the STL model with the first slicing plane according to a first set thickness to obtain a first contour curve, the first contour curve being a contour curve of a section of the STL model obtained by the first slicing plane; a first judging unit 14 configured to judge whether the contour curve contains a solid part of the STL model; a first operating unit 15 configured to, if the contour curve contains the solid part of the STL model, fill the solid part with white to obtain a white part; a first determining unit 16 configured to determine a non-solid part in the contour curve according to the solid part; a first forming unit 17 configured to fill the non-solid part with black to form a mask of the section; a second operating unit 18 configured to project the mask and the white part to liquid photosensitive resin by a first 3D printer, so as to cure the white part into a first cured contour.

Further, the device includes: a fourth obtaining unit configured to quantify voxel information of the STL model according to a voxel quantification method, so as to obtain a voxel region and an external region of the section, the voxel region having a count value greater than 0, and the external region having a count value of 0; and a third operating unit configured to fill the voxel region with white and the external region with black.

Further, the device includes: a first setting unit configured to set observation angle information and observation position information; a second determining unit configured to determine a normal vector pointing to an observation angle as a forward vector according to the observation angle; a third determining unit configured to determine a normal vector opposite to the observation angle as a backward vector according to the observation angle; a second setting unit configured to set initial values of a first region and a second region of the section in the STL model to 0; a second judging unit configured to proceed towards an observation position from a position outside the STL model and opposite to the observation position, and judge whether a normal vector of the first region is the forward vector or the backward vector; a fourth determining unit configured to, if the normal vector of the first region is the forward vector, subtract 1 from the initial value of the first region to determine a first count value of the first region; a third judging unit configured to judge whether a normal vector of the second region is the forward vector or the backward vector; a fifth determining unit configured to, if the normal vector of the second region is the backward vector, add 1 to the initial value of the second region to determine a second count value of the second region; and a sixth determining unit configured to determine the first region to be the external region and the second region to be the voxel region according to the first count value.

Further, the device includes: a fifth obtaining unit configured to obtain the first slice bitmap according to the first contour curve; a fourth judging unit configured to judge whether the first slice bitmap conforms to a preset projection size; a seventh determining unit configured to, when the first slice bitmap exceeds the preset projection size, determine that a splicing mode is required for the first slice bitmap; a sixth obtaining unit configured to uniformly split the first slice bitmap according to the splicing mode to obtain a series of unit bitmaps, the series of unit bitmaps including a first unit bitmap and a second unit bitmap; a seventh obtaining unit configured to obtain an overlapped part of the first unit bitmap and the second unit bitmap; a fifth judging unit configured to judge whether overlapped pixels of the overlapped part have values of 0; and a fourth operating unit configured to, when the overlapped pixels of the overlapped part do not have values of 0, gray edge pixels of the first unit bitmap and the second unit bitmap to obtain unit bitmaps with sizes capable of being projected by the projection apparatus.

Further, the device includes: an eighth obtaining unit configured to obtain a construction width $B_w$ of the first 3D printer; a ninth obtaining unit configured to obtain a single projection width $P_w$ of a single projection apparatus; a tenth obtaining unit configured to obtain a width $C_w$ of the overlapped part, wherein $C_w \in [0, P_w)$; an eleventh obtaining unit configured to obtain a width difference x between a sum of the projection widths and the construction width, wherein $x \in [0, P_w)$; and a twelfth obtaining unit configured to calculate a number of split blocks according to the construction width, the projection width, the width of the overlapped part and the width difference, wherein the number of the split blocks is $m = \lceil (B_w - C_w)/(P_w - C_w) \rceil$, and m is the number of the split blocks of the first slice bitmap.

Further, the device includes: a sixth judging unit configured to judge whether the width difference between the sum of the projection widths and the construction width is 0; a fifth operating unit configured to, when the width difference between the sum of the projection widths and the construction width is not 0, fill a final width of a last unit bitmap cut from the first slice bitmap with black, and determine the width of each unit bitmap in the series of unit bitmaps as the projection width; and a thirteenth obtaining unit configured to obtain a filling width of each unit bitmap according to the width of each unit bitmap in the series of unit bitmaps, the filling width being $T_w = P_w \times m - C_w \times (m-1) - B_w$, $P_w$ being the projection width, $C_w$ being the width of the overlapped part, m being the number of the split blocks of the first slice bitmap, and x being the width difference between the sum of the projection widths and the construction width.

Further, the device includes: an eighth determining unit configured to splice the first slice bitmap and a second slice bitmap to determine a first spliced bitmap; a seventh judging unit configured to judge whether a staggering parameter of the first spliced bitmap is equal to zero; a sixth operating unit configured to, when the staggering parameter of the first spliced bitmap is not equal to zero, perform a staggered splitting operation on the first slice bitmap and the second slice bitmap to obtain a staggered split pattern; a fourteenth obtaining unit configured to fill the staggered split pattern with pattern pixels to obtain a third unit bitmap; an eighth judging unit configured to judge whether the third unit bitmap meets a preset condition; and a ninth determining unit configured to, when the third unit bitmap meets the preset condition, determine the first projection information.

Various modifications and specific instances of the STL model slicing method according to the first embodiment of FIG. 1 are also applicable to the STL model slicing device according to the present embodiment, and an implementation method of the STL model slicing device according to the present embodiment will be clear to those skilled in the art from the foregoing detailed description of the STL model slicing method, such that the details thereof will not be described herein for the sake of brevity of the specification.

Third Embodiment

Based on the same inventive concept as the STL model slicing method according to the foregoing embodiment, the present invention further provides an STL model slicing device having a computer program stored thereon, which when executed by a processor, implements the steps of any method of the STL model slicing method described above.

Figure 3:
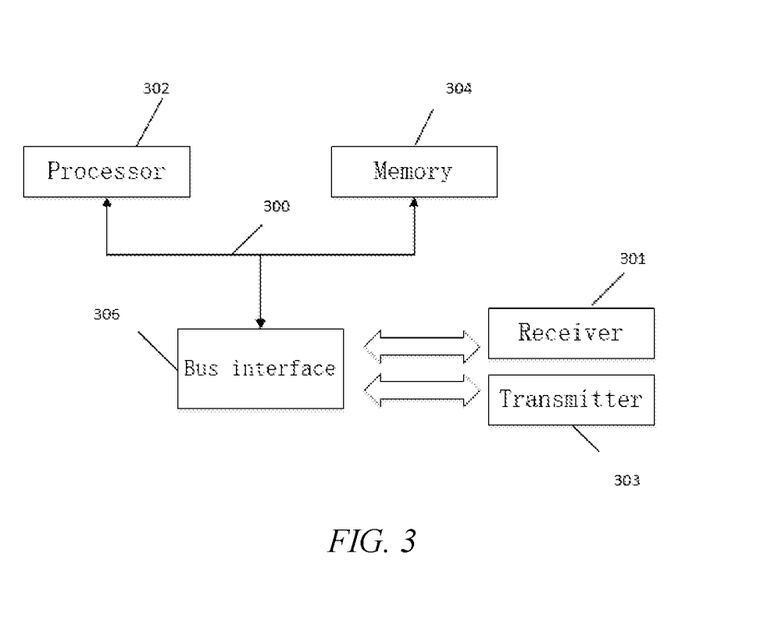
FIG. 3 is a schematic structural diagram of another STL model slicing device according to an embodiment of the present invention.

FIG. 3 shows a bus architecture (represented by bus 300), the bus 300 may include any number of interconnected buses and bridges, and the bus 300 links together various circuits including one or more processors represented by processor 302 and a memory represented by memory 304. The bus 300 may also link together various other circuits, such as peripherals, voltage regulators, power management circuits, or the like, which are well known in the art, and therefore will not be described any further herein. A bus interface 306 provides an interface between the bus 300 and a receiver 301 and a transmitter 303. The receiver 301 and the transmitter 303 may be one element (i.e., a transceiver) for providing a unit for communication with various other devices over a transmission medium.

The processor 302 is responsible for management of the bus 300 and general processing operations, and the memory 304 may be configured to store data used by the processor 302 in performing operations.

Fourth Embodiment

Based on the same inventive concept as the STL model slicing method according to the foregoing embodiment, the present invention further provides a computer-readable storage medium having a computer program stored thereon, which when executed by a processor, implements the steps of: reading and loading an STL model; obtaining a first slicing plane; horizontally cutting the STL model with the first slicing plane according to a first set thickness to obtain a first contour curve, the first contour curve being a contour curve of a section of the STL model obtained by the first slicing plane; judging whether the contour curve contains a solid part of the STL model; if the contour curve contains the solid part of the STL model, filling the solid part with white to obtain a white part; determining a non-solid part in the contour curve according to the solid part; filling the non-solid part with black to form a mask of the section; and projecting the mask to liquid photosensitive resin by a first 3D printer, so as to cure the white part into a first cured contour.

In an implementation process, the program may further implement any one of the method steps in the first embodiment when executed by the processor.

The above-mentioned one or more technical solutions in the embodiments of the present application at least have the following one or more technical effects. The embodiments of the present application provide the STL model slicing method and device, the method including: reading and loading the STL model; obtaining the first slicing plane; horizontally cutting the STL model with the first slicing plane according to the first set thickness to obtain the first contour curve, the first contour curve being the contour curve of the section of the STL model obtained by the first slicing plane; judging whether the contour curve contains the solid part of the STL model; if the contour curve contains the solid part of the STL model, filling the solid part with white to obtain the white part; determining the non-solid part in the contour curve according to the solid part; filling the non-solid part with black to form the mask of the section; and projecting the mask to the liquid photosensitive resin by the first 3D printer, so as to cure the white part into the first cured contour, thus solving the technical problem that in the prior art, when the slice contour is filled in the process of slicing the complicated STL model with the nested contours, the filling result may be inaccurate, such that the STL model is sliced inaccurately, and achieving the technical effects of accurately obtaining the contour information of the slice bitmap, improving the printing accuracy of the slice bitmap and improving the precision of the 3D printing model.

Those skilled in the art may understand that the present invention may be embodied by a method, a system or a computer program product. Therefore, the present invention may be embodied completely by hardware, software or by a combination of software and hardware. In addition, the present invention may be embodied by a computer program product implemented in one or more computer available storage media including computer available program code (including but not limited to a disk memory, a CD-ROM, an optical memory, etc.).

The present invention is described in conjunction with the flow chart and/or block diagram of the method, apparatus (system) and computer program product according to the embodiments of the present invention. It should be understood that each flow and/or block of the flow chart and/or block diagram or a combination of each flow and/or block of the flow chart and/or block diagram may be implemented by the computer program instructions. These computer program instructions may be provided to a general purpose computer, a dedicated computer, an embedded processor or the processors of other programmable data processing apparatuses to make a machine, so as to make the instructions performed by the processor of the computer or other programmable data processing apparatuses produce a device for implementing the functions prescribed in one or more flows in the flow chart and/or one or more blocks in the block diagram.

These computer program instructions may further be stored in a computer readable memory capable of leading the computer or other programmable data processing apparatuses to work in a specific manner, such that the instructions stored in the computer readable memory may produce an article of manufacture including an instruction device, where the instruction device implements the functions prescribed in one or more flows in the flow chart and/or one or more blocks in the block diagram.

These computer program instructions may further be loaded into a computer or other programmable data processing apparatuses, such that a series of operation steps may be performed in the computer or other programmable apparatuses, so as to produce computer-implemented processing, such that the instructions performed in the computer or other programmable apparatuses may provide the steps for implementing the functions prescribed in one or more flows in the flow chart and/or one or more blocks in the block diagram.

Obviously, those skilled in the art may make various alterations and modifications to the present invention without departing from the spirit and scope of the present invention. In this case, if these alterations and modifications of the present invention fall into the scope of the claims of the present invention and the equivalent technology thereof, the present invention may be intended to include these alterations and modifications.

What is claimed is:

1. A stereolithography ("STL") model slicing method, comprising: reading and loading an STL model; obtaining a first slicing plane; horizontally cutting the STL model with the first slicing plane according to a first set thickness to obtain a first contour curve, the first contour curve being a contour curve of a section of the STL model obtained by the first slicing plane; judging whether the contour curve contains a solid part of the STL model; if the contour curve contains the solid part of the STL model, filling the solid part with white to obtain a white part; determining a non-solid part in the contour curve according to the solid part; filling the non-solid part with black to form a mask of the section; projecting the mask to liquid photosensitive resin by a first 3D printer, so as to cure the white part into a first cured contour; obtaining a first slice bitmap according to the first contour curve; judging whether the first slice bitmap conforms to a preset projection size; when the first slice bitmap exceeds the preset projection size, determining that a splicing mode is required for the first slice bitmap; uniformly splitting the first slice bitmap according to the splicing mode to obtain a series of unit bitmaps, the series of unit bitmaps comprising a first unit bitmap and a second unit bitmap; obtaining an overlapped part of the first unit bitmap and the second unit bitmap; judging whether overlapped pixels of the overlapped part have values of 0; and when the overlapped pixels of the overlapped part do not have values of 0, graying edge pixels of the first unit bitmap and the second unit bitmap to obtain unit bitmaps with sizes capable of being projected by the projection apparatus.

2. The method according to claim 1, further comprising: quantifying voxel information of the STL model according to a voxel quantification method, so as to obtain a voxel region and an external region of the section, the voxel region having a count value greater than 0, and the external region having a count value of 0; and filling the voxel region with white and the external region with black.

3. The method according to claim 2, wherein the quantifying voxel information of the STL model according to a voxel quantification method, so as to obtain a voxel region and an external region of the section comprises: setting observation angle information and observation position information; determining a normal vector pointing to an observation angle as a forward vector according to the observation angle; determining a normal vector opposite to the observation angle as a backward vector according to the observation angle; setting initial values of a first region and a second region of the section in the STL model to 0; proceeding towards an observation position from a position outside the STL model and opposite to the observation position, and judging whether a normal vector of the first region is the forward vector or the backward vector; if the normal vector of the first region is the forward vector, subtracting 1 from the initial value of the first region to determine a first count value of the first region; judging whether a normal vector of the second region is the forward vector or the backward vector; if the normal vector of the second region is the backward vector, adding 1 to the initial value of the second region to determine a second count value of the second region; and determining the first region to be the external region and the second region to be the voxel region according to the first count value.

4. The method according to claim 1, further comprising: obtaining a construction width $B_w$ of the first 3D printer; obtaining a single projection width $P_w$ of a single projection apparatus; obtaining a width $C_w$ of the overlapped part, wherein $C_w \in [0, P_w)$; obtaining a width difference x between a sum of the projection widths and the construction width, wherein $x \in [0, P_w)$; and calculating a number of split blocks according to the construction width, the projection width, the width of the overlapped part and the width difference, wherein the number of the split blocks is $m = \lceil B_w - C_w)/(P_w - C_w) \rceil$ and m is the number of the split blocks of the first slice bitmap.

5. The method according to claim 4, further comprising: judging whether the width difference between the sum of the projection widths and the construction width is 0; when the width difference between the sum of the projection widths and the construction width is not 0, filling a final width of a last unit bitmap cut from the first slice bitmap with black, and determining the width of each unit bitmap in the series of unit bitmaps as the projection width; and obtaining a filling width of each unit bitmap according to the width of each unit bitmap in the series of unit bitmaps, the filling width being $T_w = P_w \times m - C_w \times (m-_1) - B_w$, $P_w$ being the projection width, $C_w$ being the width of the overlapped part, m being the number of the split blocks of the first slice bitmap, and x being the width difference between the sum of the projection widths and the construction width.

6. The method according to claim 1, further comprising: splicing the first slice bitmap and a second slice bitmap to determine a first spliced bitmap; judging whether a staggering parameter of the first spliced bitmap is equal to zero; when the staggering parameter of the first spliced bitmap is not equal to zero, performing a staggered splitting operation on the first slice bitmap and the second slice bitmap to obtain a staggered split pattern; filling the staggered split pattern with pattern pixels to obtain a third unit bitmap; judging whether the third unit bitmap meets a preset condition; and when the third unit bitmap meets the preset condition, determining the first projection information.

7. An STL model slicing device, comprising a memory, a processor and a computer program stored on the memory and executable on the processor, wherein the processor implements the steps of the method according to claim 1 when executing the program.

\* \* \* \* \*